United States Patent [19]
Larson

[11] 4,033,300
[45] * July 5, 1977

[54] ROTARY INTERNAL COMBUSTION ENGINE

[76] Inventor: Dallas J. Larson, 2001 S. 2300 East, Salt Lake City, Utah 84108

[*] Notice: The portion of the term of this patent subsequent to Sept. 7, 1993, has been disclaimed.

[22] Filed: Aug. 12, 1976

[21] Appl. No.: 713,942

Related U.S. Application Data

[63] Continuation-in-part of Ser. No. 633,346, Nov. 19, 1975, Pat. No. 3,986,483.

[52] U.S. Cl. .............................. 123/8.45; 123/43 C; 418/176; 418/261; 418/1
[51] Int. Cl.² ......................................... F02B 55/14
[58] Field of Search ........... 123/8.45, 43 AA, 43 C, 123/44 E; 418/176, 260, 1

[56] References Cited

UNITED STATES PATENTS

| | | | |
|---|---|---|---|
| 1,225,056 | 5/1917 | Riggs | 123/8.45 |
| 1,770,225 | 7/1930 | Blackman | 418/175 X |
| 3,181,512 | 5/1965 | Hapeman | 123/8.45 |
| 3,824,968 | 7/1974 | Brumagim | 123/8.45 |
| 3,855,977 | 12/1974 | Statkus | 123/8.45 X |
| 3,986,483 | 10/1976 | Larson | 123/8.45 |

FOREIGN PATENTS OR APPLICATIONS 629,349   3/1963   Belgium .............. 123/8.45

Primary Examiner—Clarence R. Gordon
Attorney, Agent, or Firm—Lynn G. Foster

[57] ABSTRACT

A rotary internal combustion engine comprising a generally cylindrical stator member having two pairs of sockets located in the periphery thereof, and a rotor member mounted to rotate about the stator member. Two pairs of opposing wedges are pivotally mounted at their vertices on the periphery of the stator member to pivot in and out of respective ones of the sockets as the rotor member is caused to rotate about the stator member. The rotor member has side walls and an interior peripheral wall which, in cooperation with the periphery of the stator member and the two pairs of pivotal wedges, define a combustion cavity and a compression cavity there between. The combustion cavity and compression cavity are disposed on opposite sides of the stator member adjacent the periphery thereof. A cam track is defined in the side walls of the rotor member to guide cam followers extending from the sides of each wedge such that the wedges are caused to pivot in and out of the sockets and to maintain sliding contact with the interior peripheral wall of the rotor member. As the rotor member rotates and the wedges pivot in and out of the sockets, the compression cavity and the combustion cavity successively increase and decrease. A fuel mixture is introduced into the compression cavity as it enlarges. As the rotor member continues to rotate, this cavity and the fuel mixture therein is compressed. The fuel mixture is ignited at or just prior to the time the mixture is fully compressed, to achieve high power efficiency. Igniting the fuel mixture causes the rotation by creating unbalanced tangential components of pressure upon inclined portions of the interior peripheral wall of the rotor member. Shortly after combustion of the fuel mixture, the combustion products are exhausted from the combustion chamber. The compression and the combustion of the fuel mixture always occurs between the opposing bases of the wedges, which bases are each configured to direct the pressure force to a pivotal pin at the opposite vertex of each wedge. Thus, all bending stresses and flexural deformations of the wedges are virtually prevented, thus substantially eliminating the traditional major problem of vane wear and distortion in rotary engine design.

16 Claims, 11 Drawing Figures

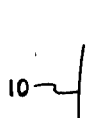
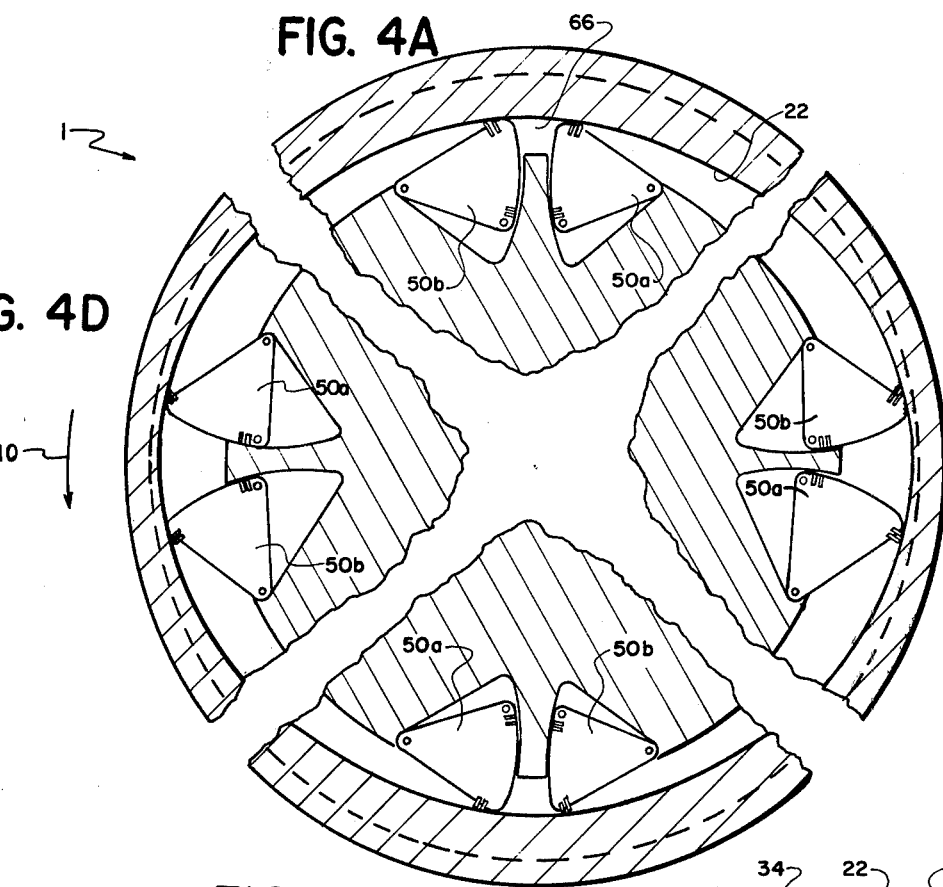
FIG. 4A
FIG. 4B
FIG. 4C
FIG. 4D
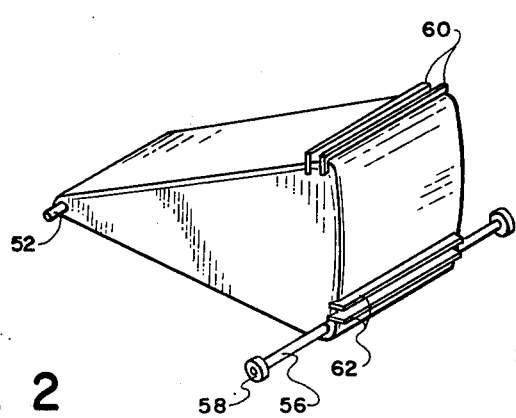
FIG. 2
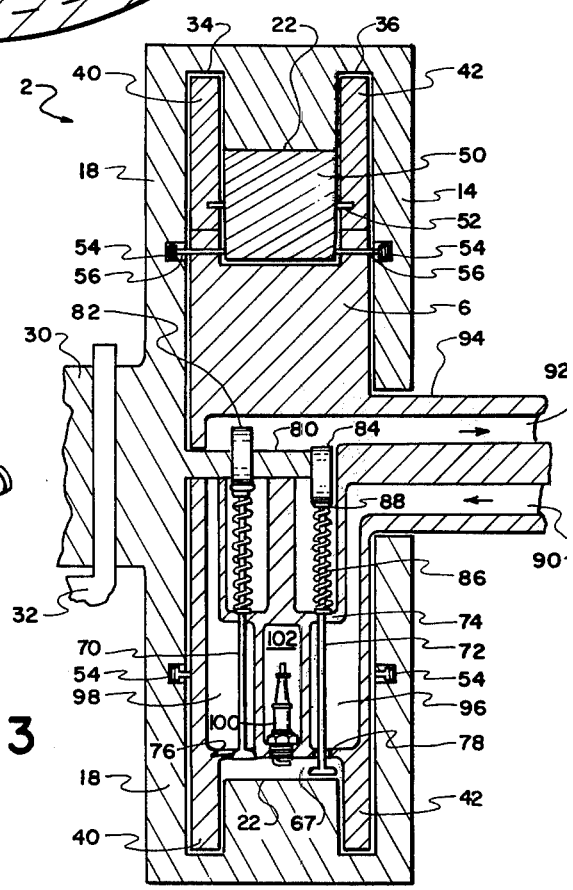
FIG. 3

ROTARY INTERNAL COMBUSTION ENGINE

CONTINUITY

This application is of continuation-in-part of U.S. patent application Ser. No. 633,346, filed Nov. 19, 1975, now U.S. Pat. No. 3,986,483 issued Oct. 19, 1976.

BACKGROUND

1. Field of Invention

This invention relates to rotary internal combustion engines and more particularly to a rotary engine in which at least a pair of pivotal wedges define the combustion chamber.

2. Prior Art

The concept of a rotary engine having rotating rather than reciprocating parts has long been of interest to engine designers. One of the continuing problems in the attempts to find a suitable rotary engine configuration is that of developing an acceptable structure for defining the combustion chamber or chambers of the engine. One approach has been to position one or more generally flat vanes in a rotor so that the vanes reciprocate in and out of the rotor as the rotor turns inside an outer casing. Fuel is introduced between the rotor and the casing and ignited to operate against the vanes and thereby cause the rotor to turn. See for example U.S. Pat. Nos. 1,354,189 and 2,345,651. One problem with these arrangements is that since the vanes receive most of the force produced by igniting the fuel, the vanes tend to rapidly wear and become deformed. Further, it is generally difficult to produce the desired compression of the fuel mixture prior to combustion.

One arrangement for improving the compression and combustion capability of rotary engines utilizing vanes is disclosed in U.S. Pat. No. 2,118,253. In this arrangement, the fuel mixture is compressed between two spaced apart, generally flat vanes disposed in a rotor body. The vanes are radially offset so that the rotor body receives a greater portion of the force of combustion than with arrangements in which the vanes are radially positioned. However, the vanes still receive a significant portion of the force of the combustion and, because of their generally flat configuration, tend to easily deform.

An arrangement utilizing a generally triangular-shaped vane or piston, rather than the flat-shaped vanes, is disclosed in U.S. Pat. No. 2,435,476. Each vane or piston of this arrangement operates independently of the other vanes and the compression of the fuel mixture is not obtained by any action of the vanes but rather the fuel mixture is compressed prior to injection into the combustion chambers. This latter feature increases the complexity and cost of the engine.

In the typical prior art rotary engine arrangement, many of the moving parts (for example the vanes) are mounted in the rotating member of the engine resulting in these parts being subject to significant centrifugal forces which increases the wear on such parts. Another common problem with the prior art arrangements arises from the need to lubricate the engine. In order for a lubricant to be applied to the rotating member of the engine, the lubricant must be supplied in some manner through the inside of the member; otherwise, the centrifugal force of the member will hamper the application of lubricant to it. However, even if the lubricant is provided through the inside of the rotating member, the centrifugal force tends to throw the lubricant from the rotating member causing inordinate lubricant losses. In current internal combustion engines, both rotary and reciprocating, the ignition of the fuel mixture is retarded so that the mixture is ignited some considerable period of time after the fuel mixture has been fully compressed and has been caused to subsequently expand by the movement of parts defining the combustion chambers. These arrangements have substantially reduced the thermodynamic efficiency of such engines.

BRIEF SUMMARY AND OBJECTS OF THE PRESENT INVENTION

The aforesaid disadvantages of the prior art in rotary engine designs are overcome in the present invention, which provides for efficient combustion of the fuel mixture by assuring its ignition and combustion at or prior to the time of its maximum compression, and by providing engine structures which inherently resist deformation and wear from combustion pressures. The invention further provides for improved and facilitated lubrication of all moving parts.

Accordingly, it is an object of the present invention, in view of the above-described prior art arrangements, to provide a new and improved rotary engine structure.

It is another object of the present invention to provide a rotary engine structure in which component parts employed to define the combustion chamber will readily resist deformation.

It is still another object of the present invention to provide a rotary engine in which the action of a pair of pivotal wedges cooperate to suitably compress there between a fuel mixture prior to combustion.

It is a further object of the present invention to provide a rotary engine in which the rotating member contains substantially none of the moving parts of the engine.

It is still a further object of the present invention, in accordance with one aspect thereof, to provide a rotary engine constructed in generally symmetrical fashion so that the actions of the moving parts thereof are substantially balanced.

It is another object of the invention to provide a rotary engine in which a fuel mixture is compressed and ignited on an advanced spark at the time, or slightly before it is fully compressed, so as to combust the fuel mixture with optimum efficiency.

A paramount object of the invention is to provide a rotary engine in which a fuel mixture is compressed and combusted between opposing bases of at least one pair of wedges pivotal at vertices respectively opposite the bases, so that the wedges are substantially free of flexural stresses and deformations.

A still further object of the invention is to provide a rotary engine wherein the moving parts may be more readily and efficiently lubricated.

A further object of the invention, in accordance with one aspect thereof, is to provide a rotary engine wherein an ignited mixture expands gradually so as to prevent significant combustion of the mixture after expansion thereof has begun.

The above and other objects and advantages of the invention are realized in a specific illustrative embodiment which includes a generally annular stator member having a pair of spaced apart sockets located in the periphery thereof, and a rotor member mounted to rotate about the stator member and formed to define a combustion cavity and a compression cavity between wedges extending between an interior peripheral wall of the rotor member and the periphery of the stator member. A pair of spaced apart wedges are pivotally mounted at their vertices on the periphery of the stator member to pivot in and out of respective ones of the sockets as the rotor member rotates. The pivoting action of the wedges operates to successively enlarge and reduce the space between the wedges and thereby provide for compressing a fuel mixture introduced there between and for expansion of the mixture when ignited at a time coincidental or prior to the time of greatest compression of the mixture.

A cam track is defined in a side wall of the rotor member to guide cam followers extending from the wedges to cause the wedges to pivot in and out of sockets and maintain sliding contact with the interior peripheral wall of the rotor member.

In accordance with one aspcet of the invention, a second pair of wedges, similar to the first pair, is pivotally mounted at their vertices on the periphery of the stator member opposite the first pair of wedges and are adapted to pivot in and out of a second pair of sockets located in the stator member to balance the pivoting action of the first pair of wedges.

Utilization of wedges provides a structure which readily resists deformation and which suitably defines compression and combustion chambers for operation of the engine. Further, with the moving parts of the engine (except for the rotor member) located in the stator member rather than the rotor member, much less wear tends to occur and lubrication of the moving parts is facilitated.

These and other objects and features of the present invention will become more fully apparent from the following description and appended claims taken in conjunction with the accompanying drawings:

BRIEF DESCRIPTION OF THE DRAWINGS

The above and other objects, advantages and features of the present invention will become apparent from a consideration of the following detailed description presented in connection with the accompanying drawings in which:

FIG. 2 is a perspective view of one of the wedges; and

FIG. 3 is a front cross-sectional view of the engine, taken along lines A—A of FIG. 1A;

FIGS. 4A through 4D are side cross-sectional schematic representations of portions of a second rotary engine embodiment in accordance with the present invention;

DETAILED DESCRIPTION OF THE ILLUSTRATED EMBODIMENTS

Figure 1A:
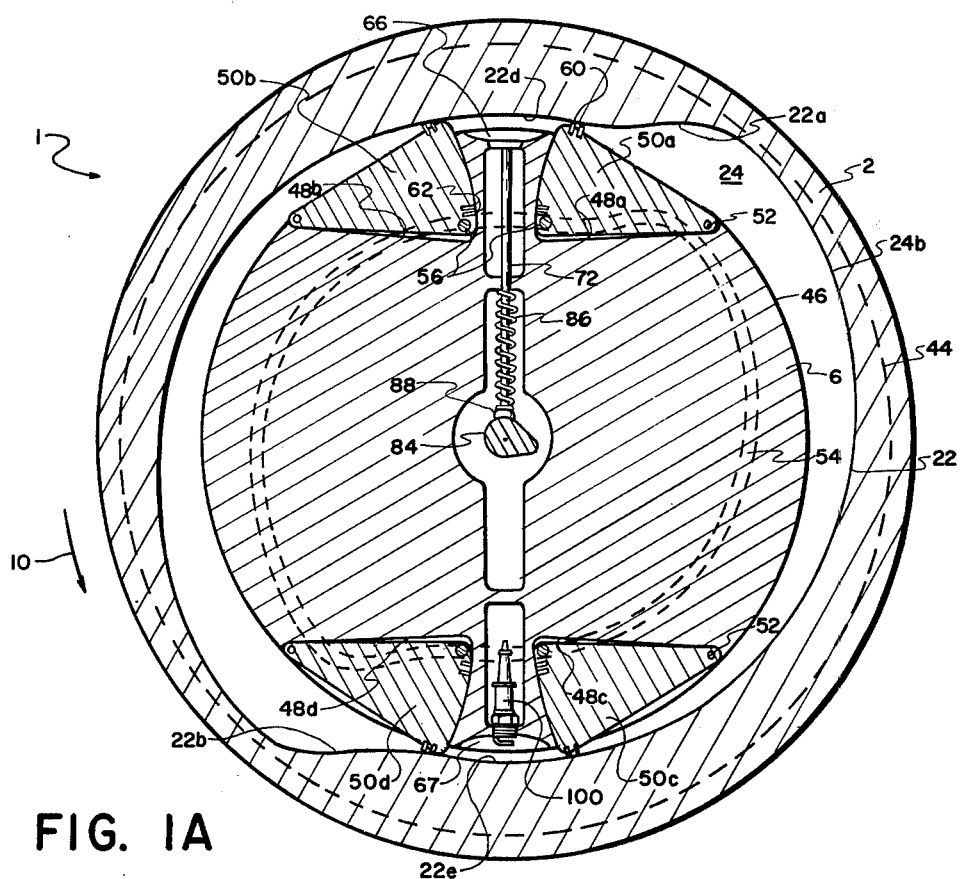
FIGS. 1A through 1D are side cross-sectional views of a first rotary engine embodiment made in accordance with the principles of the present invention, showing different positions of a rotor member of the engine.

Referring to FIG. 1A, there is a side cross-sectional view of a rotary engine, generally designated 1, which includes a rotor member 2 adapted to circumscribe and rotate about a generally annular stator member 6. The direction of rotation of the rotor member 2 is counterclockwise as indicated by the arrow 10. The rotor member 2 is formed to include side walls 14 and 18 (see FIG. 3) and an interior peripheral wall 22.

The interior wall 22 of the rotor member 2 is contoured (see FIG. 1A) to define, in cooperation with the periphery 46 of the stator member 6 and the pivotal wedges 50a, 50b, 50c, 50d, similarly shaped cavities 24 and 26 and similarly shaped cavities 66 and 67. In a manner hereinafter more fully described, fuel mixture is successively introduced into the cavities 66 and 67, compressed and combusted therein, and exhausted therefrom. The cavities 24 and 26 are positioned oppositely each other in the rotor member 2, as are the cavities 66 and 67.

Beginning at point I (see FIG. 1A) on the interior peripheral wall 22 of the rotor member 2 and moving in the clockwise direction, it is seen that the interior peripheral wall 22 has a portion 22d which curves generally parallel to, or slightly away from the periphery 46 of the stator member 6, for a distance slightly greater than the distance between the sealing inserts 60 (see FIG. 3) of the pivotal wedges 50a and 50b, the significance of which portion is hereinafter more fully detailed. The interior peripheral wall 22 then curves generally outwardly and relatively abruptly away from the periphery 46 of the stator member 6 in a convex fashion, and then curves in a concave fashion, to define a steep portion 22a of the peripheral wall 22 of the rotor member 2. The steep portion 22a then tangentially joins a second portion 24b of the wall 22 which concavely and gradually curves toward the outer periphery 46 of the stator 6 to join a second portion 22e generally parallel to the periphery 46 of the stator 6 and 180° disposed from the aforementioned parallel portion 22d. From this point, portion 22b is formed, from which the wall 22 again curves concavely and gradually to join the first mentioned parallel portion at the original Point I.

As best seen in FIG. 3, the rotor member 2 includes a shaft 30 extending from one side thereof and journaled to rotate in a bearing 32. In use, the shaft 30 would be coupled to whatever mechanism was to be driven by the engine. Although the rotor member 2 is shown journaled to rotate in a bearing 32, a variety of arrangements could be provided for mounting the rotor member to enable rotation thereof.

As also best seen in FIG. 3, the interior of the rotor member 2 includes axially spaced grooves 34 and 36 for receiving side flanges 40 and 42 respectively of the stator member 6. These flanges are indicated by dotted line 44 of FIG. 1A. The flanges, as indicated in FIG. 1A, extend radially outward further than the periphery 46 of the central portion of the stator member 6 which, as will next be discussed, carries the moving parts of the engine. (Hereafter, when speaking of the periphery of the stator member 6, the periphery 46 of the central portion of the stator member will be intended.)

Figure 1B:
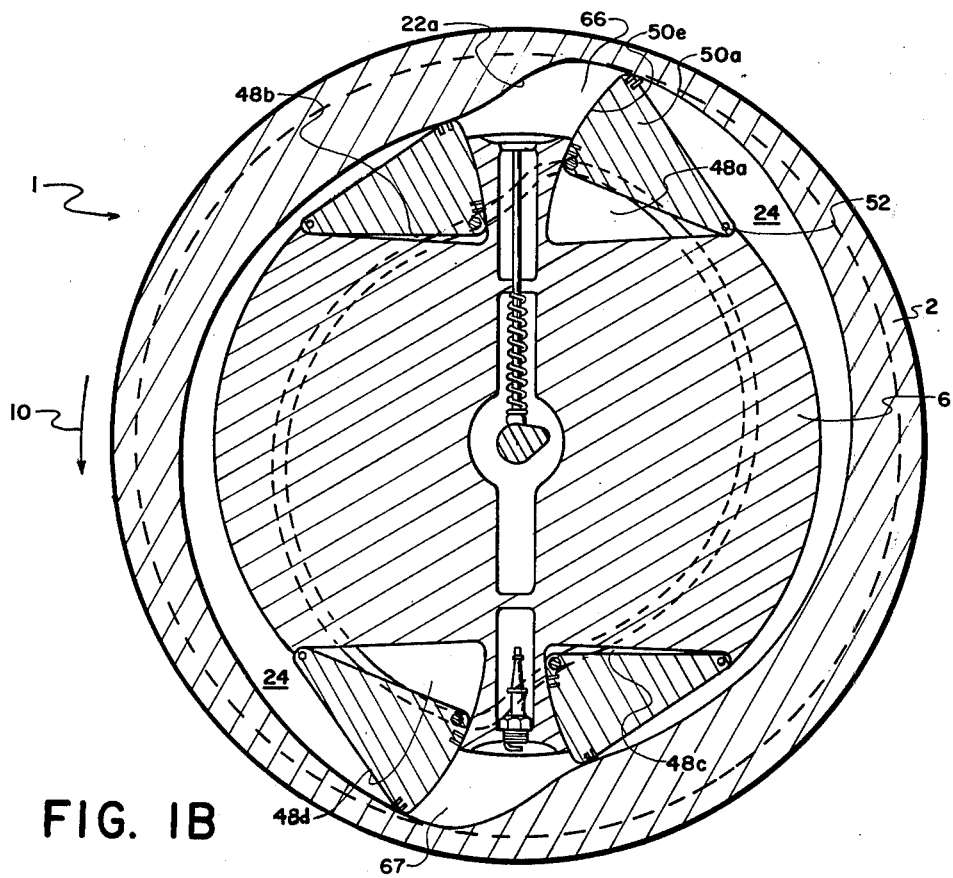
Figure 1C:
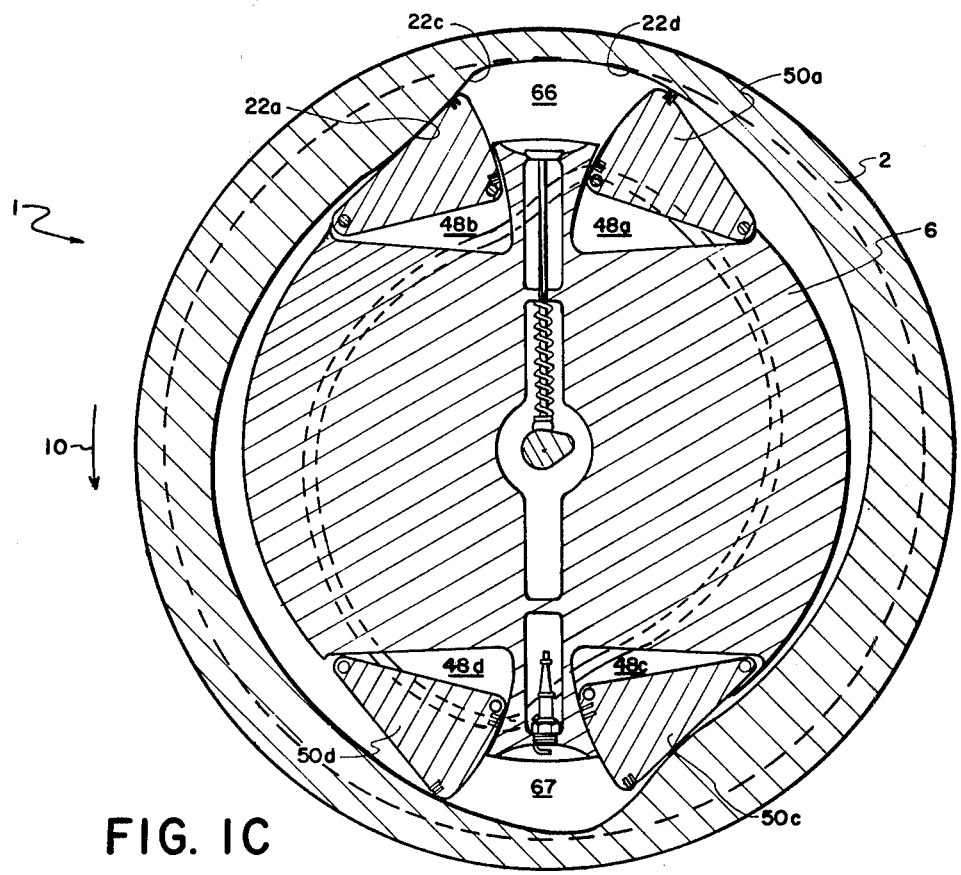
Figure 1D:
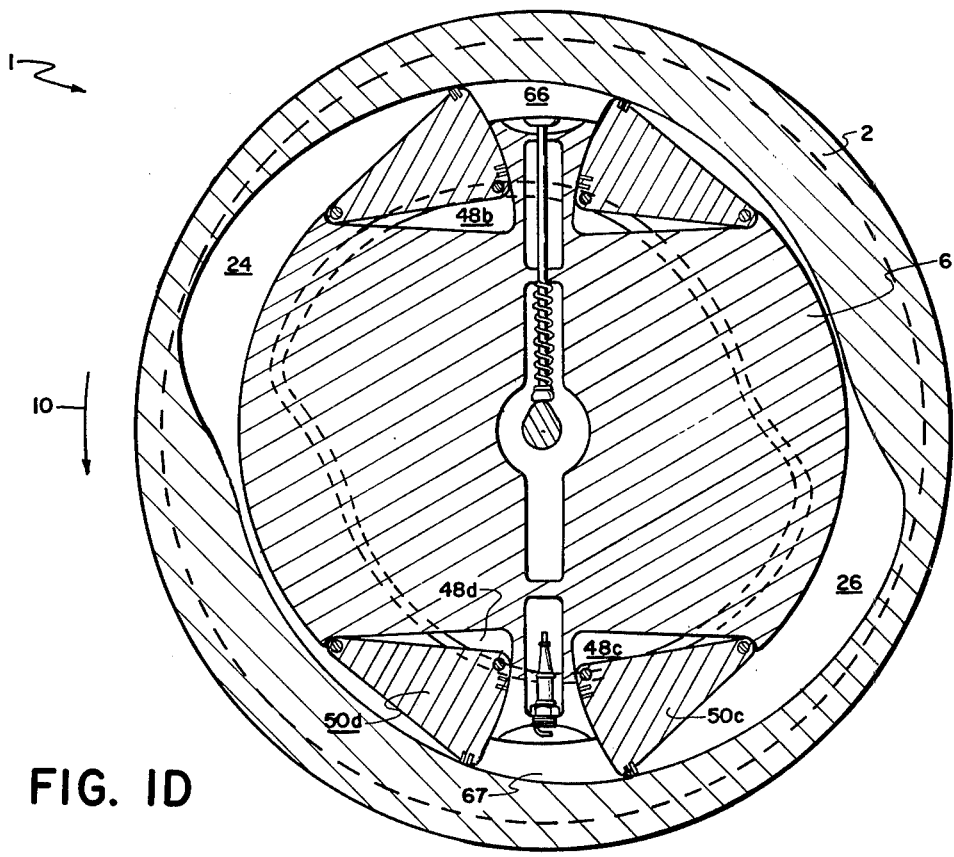

Located in the periphery of the stator member 6 are two pairs of spaced apart sockets 48a through 48d. These sockets are wedge-shaped (as better shown in FIGS. 1B and 1C) and are positioned so that the bases of the wedges are generally adjacent one another. The sockets are contoured to conform to corresponding wedges 50a through 50d which are mounted in the stator member 6 to pivot at their apexes about pins 52 extending, for example, between the side flanges 40 and 42 of the stator member (see FIG. 3). The wedges are mounted to pivot in and out of their corresponding sockets as the rotor member 2 rotates about the stator member 6 so that an outer surface of each wedge is maintained in contact with the interior peripheral wall 22 of the rotor member 2. FIGS. 1B, 1C and 1D show various wedges pivoted out of corresponding sockets.

The wedges 50 are caused to pivot in and out of their sockets and to maintain contact with the interior peripheral wall 22 of the rotor member by cam tracks 54 (shown by dotted line in FIGS. 1A through 1D) defined in the side walls 14 and 18 of the rotor member (See FIG. 3). Cam follower pins 56 extend from either side of each wedge and through the side flanges 40 and 42 to fit within and follow the track 54. Note that the track 54 has the same contour as the interior wall 22 of the rotor member 2 to cause the wedges 50 to pivot and maintain contact with the interior wall.

FIG. 2 shows a perspective view of an exemplary wedge. The wedge there shown includes a pivot pin 52 extending from either side of the wedge near the base thereof. The cam follower pin 56 carries rollers 58 at either end thereof which fit within the track 54 and facilitate the track following operation. At the upper portion of the wedge near the base thereof are a pair of sealing inserts 60 (corresponding to rings of a conventional piston engine) fitted into slots in the wedges. These sealing inserts maintain contact with interior wall 22 of the rotor member 2 to seal the chamber defined between the pairs of wedges. A second pair of sealing inserts 62 are fitted in slots in the base of the wedge near the cam follower pin 56 to contact the base wall of a corresponding socket in which the wedge is fitted. The sealing inserts are also shown in FIGS. 1A through 1C.

Each pair of wedges is positioned in the stator member 6 to define chambers 66 and 67 (See FIG. 1A) therebetween into which fuel mixtures are injected and in which combustion takes place. These chambers are defined between the base surfaces of the wedges, the interior peripheral wall 22 of the rotor member 2, and the periphery of the stator member 6. The stator member 6 is formed to provide a depression between each pair of wedges to accommodate definition of the chambers 66.

Portions of the interior of the stator member 6 are hollowed out to carry various components necessary to the operation of the engine. These components include two pairs of valves 70 and 72, and 71 and 73 (only one pair of valves 70 and 72 being shown in FIG. 3) extending from near the center of the stator member 6 between corresponding pairs of wedges into the chambers 66 and 67. The construction of valves 70 and 72 will be described, it being understood that the construction of the other pair of valves, 71 and 73 is similar in construction. The stems of the valves 70 and 72 pass through and are carried by a partition 74 in the stator member 6 to enable the valves to seat in ports or valve openings 76 and 78 located in the periphery of the stator member 6 between two wedges. The valves 70 and 72 are operated by a cam shaft 80 extending from one side wall of the rotor member 2 into the interior of the stator member 6. The cam shaft 80 carries two cams 82 and 84 to actuate valves 70 and 72, respectively. Springs 86 are coiled about the stems of the valves between the partition 74 and corresponding bases 88 of the valves to maintain the valve bases against respective cams 82 and 84.

As the rotor member 2 rotates causing the cams 82 and 84 to rotate, the valves 70 and 72 are successively moved through open and closed positions to allow fuel mixtures to pass into the chamber 66 between wedges and to allow combustion products to exhaust from the chamber. Fuel mixtures are introduced to the chamber through a duct 90 located in a shaft 94 extending from one side of the stator member 6. The duct 90 extends along the interior of the shaft 94 and through an interior passage 96 in the stator member to the port 78 leading to the chamber 66. When the valve 72 is opened, as it is shown in FIG. 3, a fuel mixture is allowed to pass through the port 78 into the chamber 66. After the valve 72 is closed and combustion takes place in the chamber 66, valve 70 is opened to allow the combustion products to pass through the port 76, through another interior passage 98, and out a duct 92 also located in the shaft 94. Arrows shown in the ducts 90 and 92 indicate the direction of travel of the fuel mixture and combustion products. Although FIG. 3, as already mentioned, shows only one pair of valves and the cavities in which the valves are mounted, it should be understood that a similar pair of valves, 71 and 73, oppositely disposed in the stator member 6 is also provided.

Spark plugs 100 are located between each pair of valves and each pair of vanes to ignite the fuel mixture introduced into the chambers 66 and 67. Each spark plug 100 is positioned in a cavity 102 in the stator member 6 so that the points of the spark plug extend into corresponding chambers 66 and 67.

The operation of the Engine 1 will now be described with reference to FIGS. 1A through 1D.

In FIG. 1A, the rotor member 2, rotating in the counterclockwise direction as indicated by the arrow 10, has reached a point in its rotation where the cavities 66 and 67 are of minimum volume. The wedges 50a and 50b are in FIG. 1A rotated substantially into respective sockets 48a and 48b. In a like manner, wedges 50c and 50d are rotated substantially into sockets 48c and 48d respectively.

Assume that the cavity 66 in FIG. 1A contains a fuel mixture, which mixture has been fully compressed. As hereinafter described, cavity 67 in FIG. 1A contains residual exhaust products from combustion of a previously combusted charge of fuel mixture. Note also that the portions 22d and 22e of the peripheral wall 22 of the rotor 2 are so disposed as to form the radially outermost portions of the boundaries of the cavities 66 and 67, and are substantially parallel to the periphery 46 of the stator 6.

The fully compressed fuel mixture in cavity 66 is ignited by a spark plug 100 (see FIG. 3). Note that this ignition of the fuel mixture in cavity 66 occurs at the point of maximum compression of the fuel mixture. Although this ignition could be timed to occur slightly before the fuel mixture in the cavity 66 is fully compressed, it is important to the efficiency of the engine 1 that this ignition not be delayed beyond the point of maximum compression of the fuel mixture. Provision of the portion 22d of the wall 22 assures that the volume 66 remains at or near minimum size for an appreciable time as the rotor 2 rotates, assuring that ignition can be timed to occur and be completed at maximum compression of the fuel mixture.

Note that the aforesaid ignition of the fuel mixture results in combustion of the fuel mixture entirely between the opposing bases of the wedges 50a and 50b. The resulting pressure on the bases of the wedges is transmitted to the pins 52 (See FIG. 2), so that the wedges 50a and 50b are not subjected to appreciable bending stresses or deformation.

After ignition of the mixture, the momentum of the member 2 causes it to move into a position rotating the steep portion 22a of the peripheral wall 22 to form a part of the boundary of the cavity 66. In FIG. 1B the rotor 2 is shown so rotated that the steep portion 22a forms a substantial part of the boundary of the cavity 66, so that the pressure therein from the combustion of the fuel mixture acts upon the steep portion 22a to cause the rotor 2 to rotate in the clockwise direction as indicated by the arrow 10. Note that the base 50e of the wedge 50a now forms a substantial portion of the boundary of the cavity 66, and that the force thereon continues to be transmitted directly to the pin 52. The exhaust valve 71 and the fuel intake valve 72 communicating with cavity 66 are both closed. (See FIG. 3).

Note also in FIG. 1B that the cavity 67 has also now enlarged. The fuel intake valve 72 communicating with cavity 67 (see FIG. 3) is now open, and a fuel mixture is therefore being drawn into the cavity 67 through the passage 90 and the intake valve opening 78 (see FIG. 3). Valve 72 is operated by the cam 84.

The rotor 2 then continues to rotate to the position shown in FIG. 1C. In FIG. 1C the cavity 66 has become of maximum size, so that the expansion of the products of combustion of the aforementioned fuel mixture therein is complete. The cavity 67 is also of maximum size, and the introduction of fuel mixture thereinto is now complete. The exhaust valve 71 communicating with cavity 66 is opened at this point, and the fuel intake valve 72 communicating with cavity 67 is closed (see FIG. 3). The exhaust valve 70 communicating cavity 67 is also closed, as is the fuel intake valve 73 communicating with cavity 66.

In FIG. 1D the rotor 2 is shown at a subsequent intermediate position wherein the cavity 66 and 67 have been partially reduced in volume to an intermediate size by rotation of the rotor 2. That is, a portion of the exhaust products from the combustion of the mixture in the cavity 66 has been exhausted through the exhaust valve 71 and the communicating exhaust passage 92 (see FIG. 3). Correspondingly, the fuel mixture now in cavity 67 has been partially compressed to an intermediate stage.

Continued rotation of the rotor member 2 places it in a position which can be illustrated by referring again to FIG. 1A. For this purpose, assume that the rotor 2 has now completed 180° of rotation from the position first assumed in FIG. 1A. Accordingly, cavity 67 in FIG. 1A now contains a fully compressed charge of fuel mixture, which is now ignited by the spark plug 100 communicating now with chamber 67. The ignited fuel mixture in cavity 67 now expands and the process described above is repeated with the cavity 67 now playing the role previously played by the cavity 66, and the cavity 66 now playing the role previously played by the cavity 67.

Because of the symmetrical configuration of the rotor peripheral wall 22, and the positioning of the pairs of wedges 50a and 50b, and 50c and 50d on opposite edges of the periphery of the stator member 6, the pivoting outwardly of one pair of wedges is balanced by a corresponding outward pivoting of the other pair of wedges. The advantages of this counterbalancing, of course, is that vibration in the engine is significantly reduced.

Also, since substantially all moving parts of the engine are located in the stator member 6 rather than the rotor member 2, stress, strain and wear on these parts is reduced.

Using wedges, and then positioning each pair of wedges so that the base of one wedge of a pair generally faces the base of the other wedge of the pair provides a sturdy structure for defining the combustion chambers. The wedges, because of their structure, are not easily deformed by the combustion of fuel in the chamber between the wedges, since the pressure force on the bases of the wedges is directed to the pins 52, so that no flexural stresses result.

The rotary engine may be proportioned to position the wedges and sockets closer or more distant from each other and to project radially for greater or lesser distances, so as to proportion the cavities there between for more rapid or slower expansion as may be required to prevent delayed ignition and combustion of the mixture.

Provision of an outer rotating member allows for introducing lubrication through an inner static member and this would serve to reduce the loss of oil which might otherwise occur from centrifugal forces impressed on the oil if the interior member rotated.

A second preferred embodiment of the engine 1 is illustrated in FIGS. 4A–4D which embodiment is configured to exploit a second preferred approach to optimumly implementing advanced ignition of fuel mixtures in the cavities 66 and 67. As herein previously emphasized, the power efficiency of internal combustion engines are greatly enhanced by ignition and combustion of fuel mixtures at or near the time of their maximum compression, so that combustion is essentially complete before substantial expansion of the products of combustion is permitted to occur.

The second preferred embodiment is illustrated schematically in FIGS. 4A through 4D and comprises a rotor periphery 22 of generally ellipsoidal shape. This contour 22 contrasts the corresponding contour 22 of the first preferred embodiment illustrated in FIGS. 1A through 1D in that no abrupt outwardly curving portion 22a of the contour 22 is provided. Rather, as is seen in FIG. 4A, the periphery 22, proceeding in the clockwise direction from a point I shown in FIG. 4A nearest the cylindrical periphery 46 of the stator 6, curves gradually away from the periphery 46 for a distance of 90°, which point is seen in FIG. 4B. Thereafter, the periphery 22 curves gradually toward the periphery 46 of the stator 6, reaching a second point, shown in FIG. 4C, of nearest proximity thereto at 180° from the original point I. Proceeding still clockwise, the periphery 22 again curves gradually away from, and then towards the periphery 46 as shown in FIGS. 4C and 4D, ultimately joining the original point I shown in FIG. 4A. At no point does the periphery 22 curve abruptly away from or towards the periphery 46.

With reference to FIGS. 4A through 4D, assume that the cavity 66 contains a fully compressed fuel mixture at a position shown in FIG. 4A and that the rotor 2 is rotating in the counterclockwise direction as indicated by the arrow 10. Assume further that the mixture in cavity 66 is ignited at approximately this position of the rotor 2. It is readily seen in FIG. 4A that continued rotation of the rotor member 2 in the counterclockwise direction results in a relatively gradual increase in volume of the cavity 66, in contrast to the rapid increase of volume of the cavity 66 which occurs with the first preferred embodiment illustrated in FIGS. 1A through 1D. This relatively gradual increase in volume of the cavity 66 provides a substantial interval of time for combustion to proceed to completion before substantial expansion occurs. Thus, delayed combustion of the mixture in cavity 66 is substantially prevented. Combustion in the cavity 66 will not continue significantly into the expansion phase of the operation.

The general mode of operation of the engine 1, as illustrated in FIG. 4A through 4D, is similar to that of the engine illustrated in FIGS. 1A through 1D. As the rotor 10 rotates in the counterclockwise direction from the position shown in FIG. 4A, pressure from the mixture combusted in the cavity 66 acts upon the portion 22a of the surface 22 between the wedges 50a and 50b. The portion 22a curves away from the stator 6, so that a component of pressure thereon impels the rotor 2 is the counterclockwise direction. When the rotor has reached a next position relative to the wedges 50a and 50b shown in FIG. 4B, the expansion of the combusted mixture in cavity 66 is complete. Cavity 66 is then exhausted during the next 90° of rotation of the rotor 2 at which time the cavity 66 is again reduced to minimum volume at a position shown in FIG. 4C. At this position, intake of fuel mixture into the volume 66 begins and is complete after the subsequent 90° of rotation to a position shown in FIG. 4D.

With continued rotation of the rotor 1, the volume 66 is again reduced in volume and the fuel mixture therein accordingly compressed in preparation for the next ignition, combustion, and expansion cycle beginning at the original position shown in FIG. 4A.

It is to be understood that the embodiment schematically represented in FIG. 4 comprises also a second pair of wedges 50c and 50d, not shown, disposed 180° from 50a and 50b. The second pair of wedges 50c and 50d operate in a manner substantially identical to the pair 50a and 50b to effect a corresponding compression, ignition, expansion, and exhaust of a corresponding fuel mixture, which is drawn into a corresponding cavity 67.

The rotary engine represented by FIG. 4A through 4D comprises also associated fuel supply ducts and valving, exhaust ducts and valving, and ignition provisions, all corresponding to those described previously for the embodiment represented in FIGS. 1 through 3.

Figure 5:
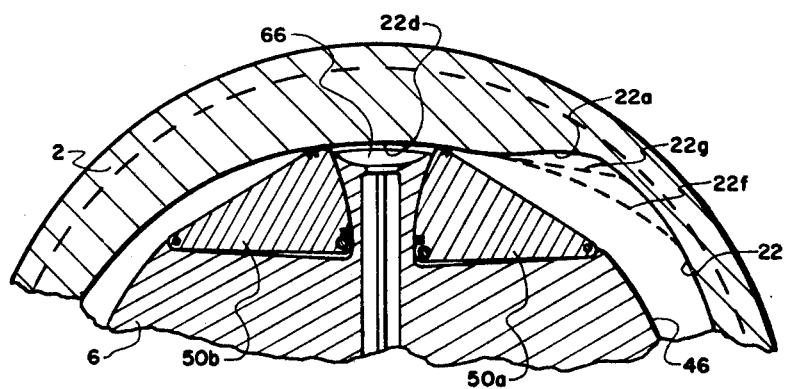
FIG. 5 is a fragmentary side cross-sectional view of the engine indicating a range of shapes of the inner periphery of the rotor of the engine selectable in accordance with the principles of the invention.

It should be understood that the contour of the periphery 22 of the rotor 2 may be selected in any particular engine design so as to manage the compression, ignition, combustion and expansion of the fuel mixture to obtain the optimum efficiency of the engine. As can be seen in FIG. 5, the periphery 22 may be designed with the steep portion 22a as in the first preferred embodiment hereinbefore described, or with a gradually outwardly curving portion as in the previously described second preferred embodiment and indicated by broken line 22f in FIG. 5.

A third and equally preferred embodiment comprises a straight, uncurved portion of contour 22, said portion being indicated by broken line 22g in FIG. 5. The portion 22g may be tangentially joined with the aforesaid portion 22d, so that the portion 22g is directed substantially tangentially in respect also to the periphery 46 of the stator 6. As hereinbefore described, employment of a contour portion such as portion 22a presents a sharply inclined surface between the wedges 50a and 50b upon which the combustion pressure acts to efficiently impel the rotor 2, but increases the difficulty of achieving the ignition and combustion of the mixture in cavity 66 before significant expansion occurs. The contour portions 22g and 22f substantially aleviate this difficulty.

It should be further understood that the inventive concept may be embodied in engine configurations comprising greater numbers of paired wedges, in which event the periphery 22 would be appropriately contoured to effect the general intake, compression, power, and exhaust functions for the increased numbers of chambers formed by the increased numbers of paired wedges.

The invention may be embodied in other specific forms without departing from the spirit or essential characteristics thereof. The present embodiment is therefore to considered in all respects as llustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent Is:

1. A rotary engine comprising
   a generally annular stator member having a first and second pair of spaced apart sockets located in the periphery thereof and having a shaft extending from one side thereof;
   a first and second pair of wedges each pivotally mounted at one of their vertices on the periphery of the stator member to pivot in and out of respective ones of said sockets as said rotor member rotates about the stator member, said wedges being mounted relative to said stator member such that a base of each wedge pivots along an arc generally towards the center of the stator member, and such that each of said bases of the wedges in each pair face each other so that a space is formed by said bases of each pair of wedges,
   a rotor member having side walls and an interior peripheral wall and mounted to rotate about said stator member, said rotor member formed to define a combustion cavity and a compression cavity between the portions of the periphery of the stator member between the bases of the wedges and the interior peripheral wall of the rotor member, said combustion cavity and compression cavity being disposed substantially 180° apart about the periphery of the stator member, said peripheral wall having two innermost portions thereof substantially parallel to the outer periphery of the stator member, said portion extending at least the distance between the bases of the wedges of each pair thereof, and said portions being disposed substantially 180° apart, said portions of the peripheral wall being joined tangentially by two curved portions thereof which each first curve convexly and outwardly away from the stator member and then curves concavely and inwardly toward the stator member,
   a cam track defined in at least one side wall of said rotor member,
   cam followers extending from at least one side of each wedge and guided by said cam track to cause said wedges to pivot in and out of said sockets and to maintain sliding contact with the interior peripheral wall of said rotor member, means for introducing a fuel mixture into the spaces between each pair of wedges.

means for igniting the fuel mixture between each pair of wedges, means for timing the ignition of the fuel mixture to selectively coincide with or slightly precede the time the said portions of the rotor peripheral wall are each disposed substantially entirely across the spaces defined between each pair of wedges, means for exhausting the combustion products from the spaces between each pair of wedges.

2. A rotary engine as in claim 1 wherein the portion of the peripheral wall of the rotor member defining said compression cavity has substantially the same contour as the portion of the peripheral wall defining the combustion cavity.

3. A rotary engine as in claim 1 wherein the shaft of said stator member has a first duct therein for conducting the fuel mixture from a fuel supply to said fuel mixture introducing means, and a second duct therein for conducting the combustion products from the exhausting means out of the engine.

4. A rotary engine as in claim 3 wherein said fuel mixture introducing means comprises first and second ports in the periphery of said stator member between the wedges of said first and second pairs of wedges respectively, and first and second passages located in said stator members for communicating with said first and second ports respectively and with said first duct.

5. A rotary engine as in claim 4 wherein said fuel mixture introducing means further comprises first and second valves disposed in said first and second ports respectively, and a cam shaft extending from one side of said rotor member into said stator member to actuate said valves.

6. A rotary engine as in claim 3 wherein said exhausting means comprises third and fourth ports in the periphery of said stator member between the wedges of said first and second pairs of wedges respectively and third and fourth passages located in said stator member for communicating with said third and fourth ports respectively and with said second duct.

7. A rotary engine as in claim 6 wherein said exhausting means further comprises third and fourth valves disposed in said third and fourth ports respectively, and a cam shaft extending from one side wall of said rotor member into said stator member to actuate said third and fourth valves.

8. A rotary engine as in claim 1 wherein said igniting means is disposed in said stator member between each pair of wedges.

9. A rotary engine comprising a generally annular stator member having a first pair of spaced apart sockets located in the periphery thereof and having a shaft extending from one side thereof, a first pair wedges pivotally mounted at one of their vertices on the periphery of the stator member to pivot in and out of respective ones of said sockets as said rotor member rotates about the stator member, said wedges being mounted relative to said stator member such that a base of each wedge pivots along an arc generally towards the center of the stator member, and such that said bases of the wedges in the pair face each other, so that a space is formed by the said bases of the pair of wedges, a rotor member having side walls and an interior peripheral wall and mounted to rotate about said stator member, said rotor member formed to define a combustion cavity and a compression cavity between the portion of the periphery of the stator member between the bases of the wedges and the interior peripheral wall of the rotor member, said peripheral wall having an innermost portion thereof being substantially parallel to the outer periphery of the stator member, said portion extending at least the distance between the bases of the wedges and said portion of the peripheral wall being joined tangentially by a curved portion thereof which first curves convexly and outwardly away from the stator member and then curves concavely and inwardly toward the stator member, a cam track defined in at least one side wall of said rotor member, cam followers extending from at least one side of each wedge and guided by said cam track to cause said wedges to pivot in and out of said sockets and to maintain sliding contact with the interior peripheral wall of said rotor member, means for introducing a fuel mixture into the spaces between the pair of wedges, means for igniting the fuel mixture between each pair of wedges means for timing the ignition of the fuel mixture to coincide with the time the said portion of the rotor peripheral wall is disposed substantially entirely across the space defined between the pair of wedges, means for exhausting the combustion products from the space between the pair of wedges.

10. A rotary engine comprising a generally annular stator member having a first and second pair of spaced apart sockets located in the periphery thereof and having a shaft extending from one side thereof, a first and second pair of wedges pivotally mounted at one of their vertices on the periphery of the stator member to pivot in and out of respective ones of said sockets as said rotor member rotates about the stator member, and wedges being mounted relative to said stator member such that a base of each wedge pivots along an arc generally towards the center of the stator member, and such that said bases of the wedges in each pair face each other, so that a space is formed by said bases of each pair of wedges, a rotor member having side walls and an interior peripheral wall and mounted to rotate about said stator member, said rotor member formed to define a combustion cavity and a compression cavity between the portions of the periphery of the stator member between the bases of the wedges and the interior peripheral wall of the rotor member, said combustion cavity and compression cavity being disposed substantially 180° apart about the periphery of the stator member, said peripheral wall having two innermost portions thereof substantially parallel to the outer periphery of the stator member, said portions extending at least the distance between the bases of the wedges of each pair thereof, and said portions being disposed substantially 180° apart, the said portions of the peripheral wall being joined tangentially by two curved portions thereof which each first curves concavely and gradually outwardly away from the stator member and then curve concavely and gradually inwardly toward the stator member, a cam track defined in at least one side wall of said rotor member, cam followers extending from at least one side of each wedge and guided by said cam track to cause said wedges to pivot in and out of said sockets and to maintain sliding contact with the interior peripheral wall of said rotor member, means for introducing a fuel mixture into the spaces between each pair of wedges, means for igniting the fuel mixture between each pair of wedges, means for timing the ignition of the fuel mixture to selectively coincide with or slightly precede the time the said portions of the rotor peripheral wall are each disposed substantially entirely across the spaces defines between each pair of wedges, means for exhausting the combustion products from the spaces between each pair of wedges.

11. A rotary engine comprising a generally annular stator member having a first and second pair of spaced apart sockets located in the periphery thereof and having a shaft extending from one side thereof, a first and second pair of wedges pivotally mounted at one of their vertices on the periphery of the stator member to pivot in and out of respective ones of said sockets as said rotor member rotates about the stator member, and wedges being mounted relative to said stator member such that a base of each wedge pivots along an arc generally towards the center of the stator member, and such that said bases of the wedges in each pair face each other, so that a space is formed by said bases of each pair of wedges, a rotor member having side walls and an interior peripheral wall and mounted to rotate about said stator member, said rotor member formed to define a combustion cavity and a compression cavity between the portions of the periphery of the stator member between the bases of the wedges and the interior peripheral wall of the rotor member, said combustion cavity and compression cavity being disposed substantially 180° apart about the periphery of the stator member, said peripheral wall having two innermost portions thereof substantially parallel to the outer periphery of the stator member, said portions extending at least the distance between the bases of the wedges of each pair thereof, and said portions being disposed substantially 180° apart, each of said innermost portions being joined by a straight uncurved portion tangential thereto and each said straight portion being joined by a curved portion which curves concavely and inwardly toward the stator member to join the other of the said innermost portions, a cam track defined in at least one side wall of said rotor member, cam followers extending from at least one side of each wedge and guided by said cam track to cause said wedges to pivot in and out of said sockets and to maintain sliding contact with the interior peripheral wall of said rotor member, means for introducing a fuel mixture into the spaces between each pair of wedges, means for igniting the fuel mixture between each pair of wedges, means for timing the ignition of the fuel mixture to selectively coincide with or slightly precede the time the said portions of the rotor peripheral wall are each disposed substantially entirely across the spces defined between each pair of wedges, means for exhausting the combustion products from the spaces between each pair of wedges.

12. A method of combusting a fuel mixture to provide power comprising:

providing a rotary engine comprising;

a generally annular stator member having a first and a second pair of spaced apart sockets located in the periphery thereof and having a shaft extending from one side thereof, a rotor member having side wall and an interior peripheral wall and mounted to rotate about said stator member, said rotor member being formed to define a combustion cavity and a compression cavity between portions of the periphery of the stator member and the interior peripheral wall of the rotor member;

a first and second pair of wedges pivotally mounted at their vertices on the periphery of the stator member to pivot in and out of respective ones of said sockets as said rotor member rotates about the stator member, so that a space is formed between the opposing bases of each pair of wedges, introducing a fuel mixture into the compression chamber;

compressing the fuel mixture;

igniting the fuel mixture coincidental with or slightly prior to the time the fuel mixture is compressed to its greatest extent, so that combustion occurs in the compression cavity between the opposed faces of a pair of said pivotal wedges, thereby imparting rotary power to the rotor;

exhausting the products of combustion of the fuel mixture from the rotary engine;

taking rotary power from the rotor by any suitable means.

13. The method of claim 12 wherein:

the interior peripheral wall of the rotor member is shaped to provide for gradual expansion of the mixture ignited in the compression chamber, so as to prevent significant expansion of the mixture before combustion thereof is complete.

14. The method of claim 12 wherein:

the interior peripheral wall curves first steeply away from the stator member and then gradually toward the stator member, so as to provide a steep portion thereof upon which combustion pressure may act to impart rotary motion to the rotor.

15. The method of claim 12 wherein:

the interior peripheral wall is directed first tangentially away from the stator member and then curves gradually toward the stator member so as to prevent significant expansion of the mixture before combustion thereof is complete.

16. The method of claim 12 wherein:

the interior peripheral wall curves first gradually away from the stator member and then gradually toward the stator member so as to prevent significant expansion of the mixture before combustion thereof is complete.

* * * * *